W. Elwell,
Fly Trap,
N° 25,997. Patented Nov. 1, 1859.
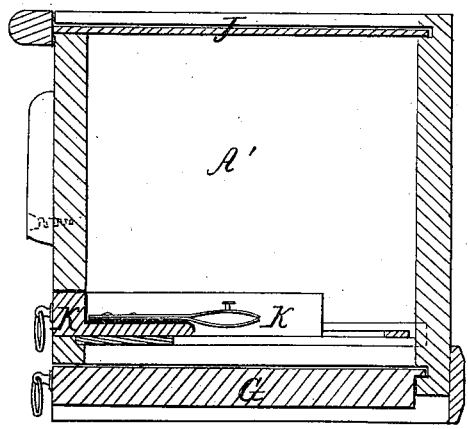
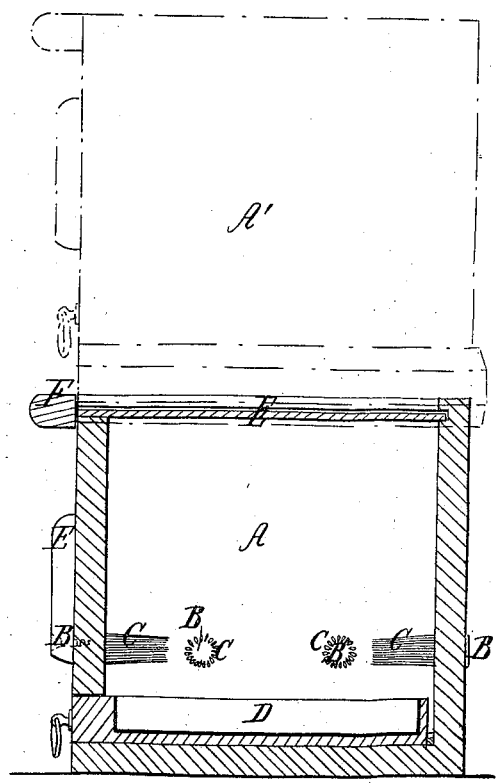
Witnesses;
Josiah Macy
E. M. Halstead
Inventor;
William Elwell

UNITED STATES PATENT OFFICE.

WM. ELWELL, OF GARDINER, MAINE, ASSIGNOR TO HIMSELF AND N. O. MITCHELL, OF SAME PLACE.

FLY-TRAP.

Specification of Letters Patent No. 25,997, dated November 1, 1859.

*To all whom it may concern:*

Be it known that I, WILLIAM ELWELL, of Gardiner, in the county of Kennebec and State of Maine, have invented a new and useful Improvement in Fly-Traps; and I do hereby declare that the following is a full, clear, and exact description thereof, reference being had to the accompanying drawings, forming a part of this specification, in which—

Figure 1 represents a vertical section taken through the trap with the box for destroying the flies placed thereon and shown in red lines. Fig. 2 is a vertical section taken through this box for killing the flies after they have been entrapped.

Similar letters of reference indicate corresponding parts in the two figures.

My invention and improvement in traps for ensnaring flies consists of two quadrangular boxes each of which is to be furnished with a sliding glass top for inducing the flies to pass from the lower to the upper box after they have been caught for killing them with the fumes of sulfur or other suitable substance, a provision being made for this purpose in the upper box; the lower box contains perforations through its sides with the holes surrounded by pointed pins so as to permit the flies to readily pass through the holes, but prevents their escape when once in. The bait will be molasses or any thing sweet and attractive which is placed in a sliding drawer, all as hereinafter described, making a simple, cheap and efficient trap which will require very little attention to keep it in order.

To enable others skilled in the art to understand and use my invention I will proceed to describe its construction and operation.

A, represents a quadrangular box made of either wood or metal with perforations B, B, surrounded by pins C, projecting inside of the box which may be bent so as to form tapering apertures and prevent the flies from escaping from the box after once getting in. The drawings represent two holes on each side of the box, but these may be as numerous as occasion demands. In the bottom of this box A, is a narrow drawer D, for containing the bait, such as treacle, honey or any sweet substance, and E, is a cover for closing the hole of the drawer when it is removed for refilling so as to prevent the flies from escaping. In the top of this box A, is a glass slide E′, the whole size of the top of the box with a ledge F, for readily removing it when it is desired to remove the flies from the lower to the upper box A′, which box is provided with a wooden sliding bottom G, and a ring for drawing it out, and it is placed upon the top of box A, when removing the flies into it. This is effected by simply withdrawing the bottom G, and glass top E′, of box A, when the flies will be attracted into the upper box by the light which is let in through a sliding glass top J. When the flies have all ascended into this upper box, the wooden bottom G, is placed on and the box removed leaving the lower box, after having put on its glass top ready for another supply.

The box A′, has a drawer K, with a holder for sulfur matches, or a small cup will serve equally as well, into which is placed a small quantity of sulfur, which, when ignited and placed in the box will soon kill the flies when they can be readily removed by opening the bottom, and the box is ready for repeating the operation.

Having thus described my invention what I claim as new and desire to secure by Letters Patent, is,

The two boxes A, A′, of a quadrangular or other shape provided with sliding glass tops and sliding bottom G, in combination with the perforations B, surrounded with projecting pins for the purposes, and when the same are all arranged in the manner herein set forth.

WILLIAM ELWELL.

Witnesses:
JOSIAH MAXEY,
G. M. HALSTEAD.